Aug. 17, 1926.　　　　　　　1,595,990
M. J. BURKE
VEHICLE
Filed Oct. 30, 1923
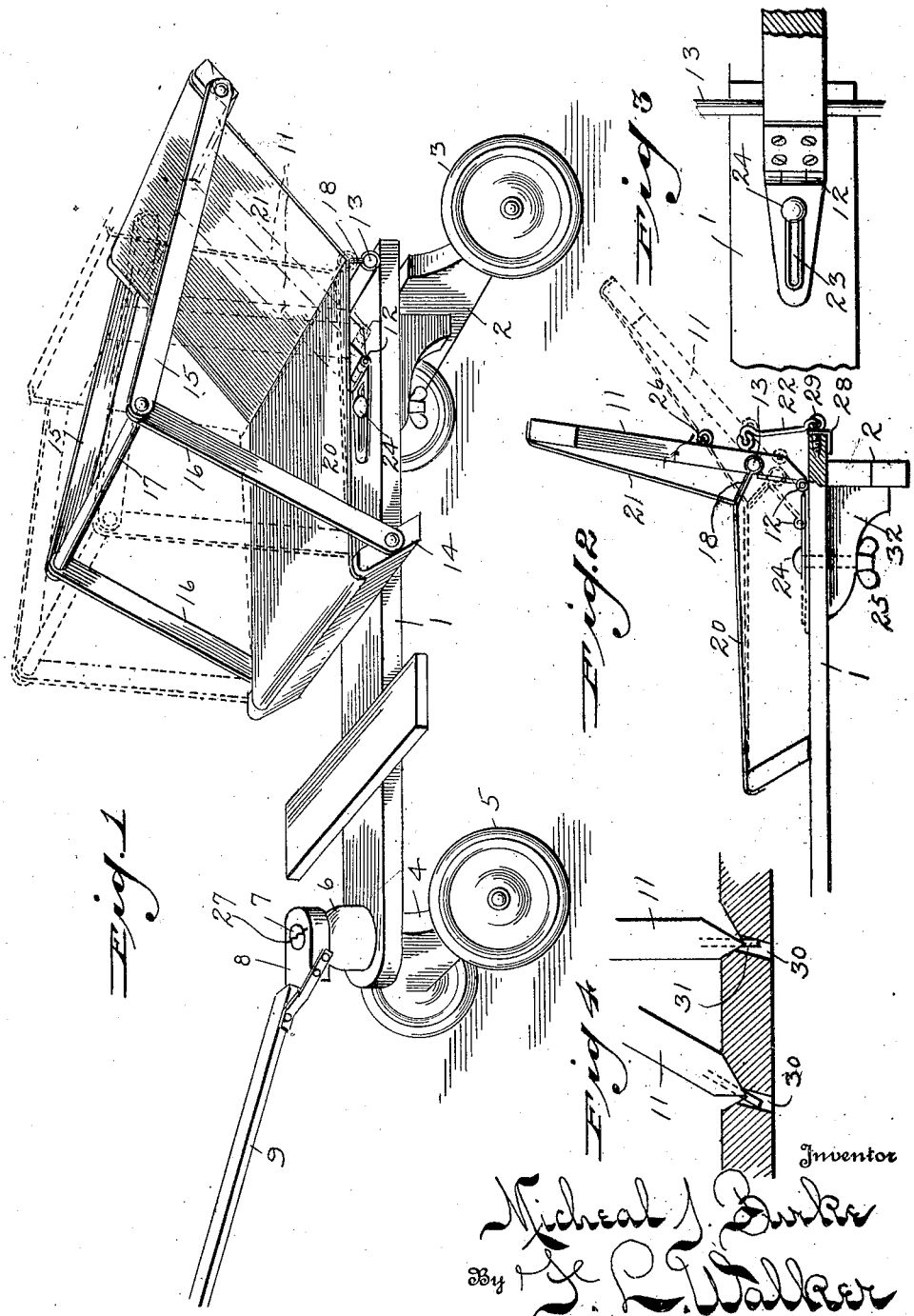
Inventor
Micheal J Burke
By L. C. Walker
Attorney Patented Aug. 17, 1926.

1,595,990

UNITED STATES PATENT OFFICE.

MICHAEL J. BURKE, OF DAYTON, OHIO.

VEHICLE.

Application filed October 30, 1923. Serial No. 671,672.

My invention relates to hand drawn vehicles and more particularly to a child's vehicle of collapsible type.

The present invention is an improvement upon the child's vehicle disclosed in United States Patent to Milton L. Dunkelberger, No. 1,465,211, issued August 14, 1923. The present invention is shown applied to a vehicle of the wagon type, although it is obvious that it may be mounted upon sled runners. It embodies a folding or collapsible seat provided with side arms, and a transversely arranged retaining bar, which seat is foldable or collapsible substantially to parallelism with the bed board of the vehicle structure. When collapsed the tongue of the vehicle is turned across the folded seat and locked to retain the parts in compact relation. The seat itself consists of a length of fabric which forms not only the seat section, but also a yielding back, which are placed under tension by the erection of the seat frame, to afford the necessary resiliency to absorb vibration.

The present construction is an improvement upon such collapsible seat construction, by which it is adapted for very small children or older children when asleep. Heretofore such seat back could not be reclined and is at the limit of its rearward movement when erect because of the tension or resistance of the fabric seat and back sections. These are tensioned by the movement of the back to erect position and will not permit further adjustment or reclining relation of the back. The present invention pertains to means for enabling such further adjustment rearwardly of the seat back, while maintaining the fabric seat and back sections under tension in various positions to which the seat back may be reclined. This is effected by providing a sliding adjustment of the hinge connection of the back strut with the bed board. By this means, the lower end of the seat back or strut may be shifted forwardly allowing the top of the seat back to be reclined rearwardly, while still effecting the tension of the fabric seat and back section.

The object of the invention is to provide a collapsible seat structure for children's vehicles, which will not only be cheap in construction, but will be efficient in use, capable of being easily and quickly adjusted to either upright or reclining position, capable of being quickly and conveniently collapsed or folded to compact form, and unlikely to get out of repair.

A further object of the invention is to provide means by which the fabric seat and back sections can be placed under substantially equal tension by the adjustment of the back standard or strut to either the upright or reclining position.

A further object of the invention is to provide improved means for interconnecting the king pin with the draft head or tongue connection.

A further object of the invention is to provide an improved form of reinforcement for the rear end of the vehicle which will resist the tensioning effect of the seat back or standard in either its upright or reclined position.

With the above primary and other incidental objects in view as will more fully appear in the specification, the invention consists of the features of construction, the parts and combinations thereof, and the mode of operation or their equivalents as hereinafter described and set forth in the claims.

Referring to the accompanying drawings, wherein is shown the preferred, but obviously not necessarily the only form of embodiment of the invention, Fig. 1 is a perspective view of a child's wheeled vehicle, to which the present invention has been applied. Fig. 2 is a detail side elevation showing the relative adjustment of the seat part. Fig. 3 is a detail top plan view of the connection between the bed board and the back strut or standard.

Like parts are indicated by similar characters of reference throughout the several views.

The vehicle to which the present invention has been applied, may comprise either a wagon structure or a sled. In the present instance, there is shown a wheeled vehicle consisting of the bed board 1, supported upon a rear axle or bolster 2, which are rotatably secured rear carrying wheels 3. At its forward end, the bed board 1, is supported upon a pivoted bolster or axle 4, to which are rotatably secured the forward carrying wheels 5. Secured to the forward end of the bed board 1 is an upwardly projecting head or boss 6, through which extends the king pin 7, forming the pivotal connection of the forward axle 4. To the upper end of the king pin there is fixedly connected a short arm or draft head 8, to which is hinged the draft tongue 9.

Mounted upon the bed board 1, is a folding seat frame comprising a seat back standard 11, of somewhat T-shape, hinged at its lower end at 12 to the bed board 1 for forwardly and downwardly folding movement. Adjacent to its lower end, but in spaced relation with its pivotal connection, the standard 11 carries a cross arm or rod 13 to which is connected the rear end of the fabric seat section. The forward end of the flexible fabric seat section is fixedly secured to a transverse seat rail 14, secured to the bed board 1, in forwardly spaced relation with the back standard 11. Side arms 15 are pivoted to the extremities of the T-shaped top of the back standard 11, and extend forwardly therefrom with their forward ends pivotally connected to the upper ends of the swinging struts 16. The lower ends of struts are pivoted to the end of the seat rail 14. A transverse retaining bar or rod 17 connects the joints of the side arms and swinging struts and extends across the seat in front of the occupant. The seat itself consists of a strip of fabric, such as canvas or other strong but flexible material, medially folded upon itself and stitched transversely to form therein a medially disposed loop 18, within which the transverse rod 13 engages. The stitching of the loop 18 medially in the fabric strip forms thereof two sections, comprising a seat section 20 which extends forwardly from said loop to its permanent attachment to the seat rail 14, by tacking or otherwise, and a second upwardly and backwardly inclined section attached at its upper end to the cross head of the back standard 11. This upwardly inclined section forms the yielding back of the seat. The cross rod 13 of the back standard is spaced somewhat above the pivotal center of the standard, and moved to and fro as the seat is erected or depressed, thus placing the fabric seat section under tension, as the seat standard is raised to erect position. The seat back is held erect by the hook 22, carried upon the rear of the bed board 1, engaging a suitable eye in the back standard 11.

As thus far described, the construction is that disclosed in the prior patent to Dunkelberger, to which the present improvement is applied.

In improving the construction described to enable the seat back to be reclined while still retaining the canvas or fabric seat under tension, the hinge 12 at the lower end of the back standard 11 is slidingly adjustable upon the bed board 1. As a simple but economical construction, an ordinary strap hinge is employed, one leaf of which is slotted as at 23, to receive a clamp bolt 24. The margins of the slot 23 are upturned or flanged to stiffen and strengthen the hinge connection 12. The clamp bolt 24 is preferably though not necessarily an ordinary carriage bolt having the shank flattened adjacent to its head, to prevent turning. This clamp bolt extends downwardly through the bed board 1, and through a bracket or brace member 32, secured to the rear bolster 3, and the under side of the bed board, and carries at its lower end a butterfly nut 25. This construction enables the lower end of the back strut 11 to be slidingly adjusted in a fore and aft direction and to be secured at either limit or any intermediate point of adjustment. By adjusting the lower end of the strut 11, forwardly, the seat back may be reclined rearwardly from its normal upright position shown in dotted lines in Fig. 1 to the reclining position indicated by solid lines. The range of adjustment is also shown in Fig. 2, wherein the upright or normal position of the seat is indicated by solid lines, and the vehicle reclining position is shown by dotted lines. In either position of adjustment the rearward oscillation of the back standard 11 tends to tension the fabric seat portion 20 and 21. The seat back is held in its depressed or reclining position with the fabric under tension by the same locking hook 22, which engages a second screw eye 26, located a greater distance from the hinge point of the standard than the screw eye normally engaged by the hook 22 when the back is erect.

It has heretofore been the practice to connect the draft head or tongue connection 8 with the upper end of the king pin 7 by means of a brad or nail, driven transversely through the parts. Since the king pin is usually made of hard wood, while the draft head or connection 8 is comparatively soft, some difficulty has been experienced in driving the brad or nail through the part and also through their tendency to work loose and permit relative movement of the head block 8 and the pin. To overcome this difficulty, these parts are interconnected in the improved construction by means of a corrugated nail 27, which is a standard product and consists of a bit of corrugated sheet metal sharpened on one end and which is driven longitudinally into the upper end of the king pin 7, with the marginal edges of the corrugated nail intersecting the draft block 8.

Some difficulty has heretofore been experienced through the tendency of the locking hook 22 to pull out of the bed board 1, or to split the end of the board under the influence of the tensioned pull of the seat standard 11. To overcome this difficulty the locking hook 22 is reinforced by means of an angle plate 28, one flange of which extends beneath the bed board 1, while the other flange overhangs the end of the board and is perforated to receive the screw eye 29 by which the hook 22 is attached to the bed board.

It is obvious that other methods of interconnecting the back strut 11 with the bed board 1 in different positions of fore and after adjustment may be employed. However, the slotted hinge connection as shown in the drawings and heretofore described is to be preferred, but it is to be understood that the invention is not limited to this specific form of attachment. For example, there has been shown in Fig. 4, a modification of the adjustable connection. In Fig. 4 the bed board has been shown provided with a series of spaced grooves or notches in any one of which the lower end of the strut 11 may be seated. The bed board is also shown provided with a series of spaced holes 30, in any one of which a stud or nail 31 in the lower end of the back strut 11 may be engaged. The grooves and holes being arranged in a fore and aft series, the engagement of the lower end of the stud in different grooves or different holes enables the back to be reclined with the same effect, as if the sliding hinge 12 is adjusted forwardly and rearwardly.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is, therefore, claimed in any of its forms or modifications within the legitimate and valid scope of the appended claims.

Having thus described my invention, I claim:

1. A traveling vehicle having a folding seat frame mounted thereon and a strip of fabric forming the seat bottom having one end stationarily secured in relation with the vehicle, and the other end of the fabric strip being secured to said folding seat frame, the fabric strip being placed under tension by the erection of the seat frame, characterized by an adjustable connection between the folding seat frame and the vehicle enabling a shifting movement of the seat frame toward and from the point of stationary attachment of the fabric strip with the vehicle enabling the fabric seat bottom to be equally tensioned by different degrees of adjustment of the folding seat frame.

2. A traveling vehicle having a folding seat including an oscillatory strut mounted upon the vehicle and a flexible seat section having one end stationarily secured in relation with the vehicle, and the other end attached to the strut in eccentric relation with the center of oscillation of the strut and tensioned by the oscillatory movement of the strut, characterized by a movable fulcrum for the oscillatory strut enabling adjustment of the center of oscillation toward and from the point of stationary attachment of the flexible seat section, thereby necessitating the movement of the strut throughout different degrees of oscillation to effect the tensioning of the flexible seat section.

3. A folding seat frame including an oscillatory support, a flexible seat section, having one end stationarily secured and the other end connected to the oscillatory support in eccentric relation with its center of oscillation and placed under tension by and limiting the oscillation of the support, and an adjustable fulcrum connection for the lower end of the oscillatory support enabling the shifting movement of the center of oscillation toward and from the point of stationary attachment of the flexible seat section, to permit a greater or less degree of oscillatory adjustment of the support within the limit determined by the flexible seat section.

4. A collapsible seat including a strip of fabric, a support to which one end of the strip is stationarily secured and a tilting back strut to which the other end of the fabric strip is attached in offset relation with the center of oscillation of the tilting back, and by the adjustment of which the fabric strip is placed under tension, the lower end of said strut being capable of rocking movement in various positions differently spaced relative to the stationary attachment point of the strip to enable the fabric strip to be equal tensioned in various reclining positions of the back strut.

5. A collapsible seat including a strip of fabric, a support to which the forward end of the fabric strip is secured, a pivotally mounted back strut to which the rear end of the fabric strip is attached in spaced relation with its pivotal connection, said fabric strip forming a seat section which is placed under tension by the tilting movement of the back strut, the pivotal connection of said strut and the support for the forward end of the fabric strip being relatively adjustable one in relation with the other to enable the tensioning of such strip by various reclining adjustment of the strut.

6. A folding seat structure including a base, a jointed collapsible frame including an oscillatory strut hinged to the base, a connecting hinge for the base and strut, one leaf of the hinge being slotted, and a clamp bolt engaging through the base and the slot in the hinge to hold the connecting hinge in various positions of sliding adjustment relative to said base.

7. A collapsible seat frame including an adjustable back strut, a fabric seat section having one fixed connection and a second connection to the adjustable back, whereby it is placed under tension by the oscillatory movement of the back strut, and means for varying the center of adjustment of the back strut toward and from the fixed connection of the seat section to place the seat section under equal tension by the movement of the back strut to different radial positions in relation with its axis of oscillation.

8. A collapsible seat frame including an adjustable oscillatory back strut, a fabric seat section having one end fixedly connected and a second connection to the adjustable back whereby it is placed under tension by the oscillatory movement of the back strut, and a shiftable fulcrum for the back strut movable toward and from the fixed connection of the seat section and about which the back strut is movable to different inclined positions.

9. A collapsible seat frame including an adjustable back strut, a fabric seat section placed under tension by the oscillatory movement of the back strut, a pivotal connection for the back strut capable of to and fro adjustment in a fore and aft direction, said seat section being attached to the strut intermediate its pivotal connection and the free end of the strut, and limiting its oscillatory movement, the extent of movement of the strut before being so limited, being varied by the fore and aft adjustment of the pivotal connection by which the back strut may be inclined to greater or less degree when the seat section is under tension.

10. In a folding seat, a base, a collapsible seat frame, including an adjustable back, hinged to the base for fore and aft oscillation, a flexible seat section connected to said back in spaced relation with its pivotal connection and placed under tension by the rearward oscillation of the back, said back being engageable with the base for oscillatory movement in different positions of fore and aft adjustment thereby permitting the movement of the back to different degrees of inclination before the seat section is under tension.

11. In a folding seat, a base, a collapsible seat frame, including an adjustable back, hinged to the base for fore and aft oscillation, a flexible seat section, connected to said back in spaced relation with its pivotal connection and placed under tension by the rearward oscillation of the back, a hinge one leaf of which is fixedly attached to the seat back, the other leaf of which is slidingly connected with the base, and means to lock the hinge in different positions of sliding adjustment, whereby said back is permitted oscillatory movement to different degrees of inclination before being limited by the tensioning effect upon the seat section.

12. In an adjustable seat, an oscillatory back strut hinged for fore and aft oscillation, a flexible seat section attached to the back strut in spaced relation with its center of oscillation, a support for the forward end of the flexible seat section, and means enabling the relative adjustment in a fore and aft direction of the center of oscillation of the back strut and the forward end of the flexible seat section in relation one to the other, to enable the back strut to be reclined in different positions of adjustment with the flexible seat section under tension.

13. In a seat construction wherein the seat back may be adjusted to different reclining positions while maintaining a flexible seat section under tension in such different positions of the back, a back strut hinged for oscillatory movement in a fore and aft direction, a flexible seat section connected to the back strut in eccentric relation with its center of oscillation, attachment means for the forward end of the seat section resisting the pulling tension exerted upon the seat section by the oscillatory movement of the back strut, the center of oscillation and point of attachment of the forward end of the seat section being relatively adjustable in a fore and aft direction one in relation to the other to permit greater or less degree of oscillatory movement of said strut.

In testimony whereof, I have hereunto set my hand this 29th day of October A. D. 1923.

MICHAEL J. BURKE.